Figure 1:
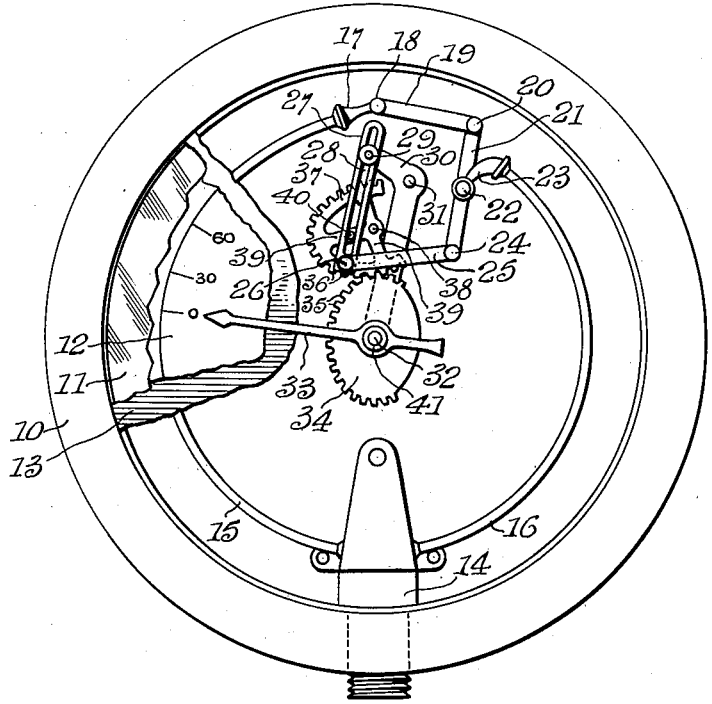

March 6, 1945.  J. W. MARSH  2,370,678

PRESSURE GAUGE

Filed Nov. 13, 1942

Inventor
John W. Marsh

By Francis H. Vandeveken and Joseph E. Crowe

Attorneys

Patented Mar. 6, 1945

2,370,678

UNITED STATES PATENT OFFICE 2,370,678

PRESSURE GAUGE

John W. Marsh, United States Army, Washington, D. C.

Application November 13, 1942, Serial No. 465,463

7 Claims. (Cl. 73—413)

(Granted under the act of March 3, 1883, as amended April 30, 1928; 370 O. G. 757)

The invention described herein may be manufactured and used by or for the Government for governmental purposes, without payment to me of any royalty thereon.

This invention relates to a gauge movement and more particularly to a gauge movement adapted to impart a variable speed rotation to the indicating hand of a gauge so that the fastest hand travel occurs within a certain portion of the indicated pressure range.

In usual constructions the gauge face is divided into equal portions, providing equal angular movements of the indicating hand for the entire hand travel. In this type of construction, the gauge movement usually consists of circular gear members which actuate the indicating hand. On gauges of this type, when used in connection with high pressure apparatus, the constant angular movement of the indicating hand is not adapted to indicate small variations in pressure because of the relatively short distance between dial calibrations and the relatively short angular movement adapted to cover this short distance.

I am aware that gauges have been devised which show only a portion of the pressure range, and that gauges have been devised which have an indicating hand adapted to traverse the whole pressure scale and a second indicating hand adapted to traverse an enlarged portion of the pressure scale showing smaller variations in pressure. A disadvantage of the first type gauge mentioned is that it does not indicate pressure much above or below the operating range, and a disadvantage of the second type gauge mentioned is that more than one movement is required to actuate the multiple indicating hands.

By my device, movement is imparted to the indicating hand of a gauge so that said hand moves relatively slowly in certain portions of the pressure range and relatively rapidly in that portion of the pressure range in which the operator is interested. This is accomplished by substituting for the usual circular gear construction, a non-annular gear construction such as a pair of elliptical gears or elliptical sectors. The gauge dial calibrations are spaced in accordance with the travel of the indicating hand with the result that the widest spacings occur in the range of fastest hand travel therefore affording a maximum sensitivity of the gauge to minor pressure variations in this range.

Accordingly, it is an object of the present invention to provide a mechanical movement for a gauge.

Another object of the present invention is to provide a mechanical movement for the indicating hand of a gauge adapted to move said indicating hand at a variable rate of speed.

Another object of the present invention is to provide a mechanical movement for the indicating hand of a pressure gauge adapted to provide maximum travel of the indicating hand during a portion of the indicated range.

These and other objects of the present invention will become apparent from the following detailed description taken in conjunction with the accompanying drawing, and the invention will be pointed out with particularity in the claims appended hereto.

In the drawing:

Fig. 1 is a front view showing the interior of a gauge containing my mechanical movement with portions of the gauge glass, gauge dial and gauge front plate indicated in broken outline.

Figure 2:
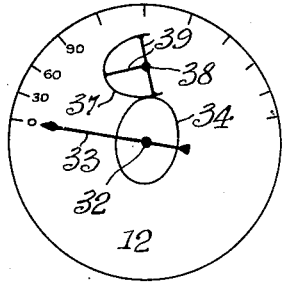
Figure 3:
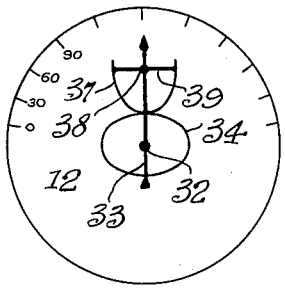
Figure 4:
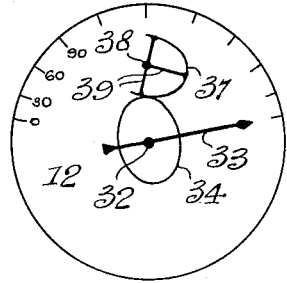

Figs. 2 to 4 inclusive are diagrammatic representations showing the position of the indicating hand for various operative positions of the mechanical movement.

Referring to Fig. 1, 10 indicates the gauge casing, 11 indicates the gauge glass, 12 indicates the calibrated gauge dial, and 13 indicates the front cover plate upon which the gauge dial is mounted. These elements, aside from the method of calibrating the gauge dial, form no part of the present invention and may be of conventional design.

In order that the gauge may be connected to a source of pressure, such as steam line, a pressure inlet fitting 14 is provided. Inlet 14 feeds into a pair of self-draining type Bourdon tubes 15 and 16 which serve as the pressure responsive elements of my gauge. Tubes 15 and 16 are of conventional oval cross-section and have at their respective ends fittings 17 and 23 which close off the tubes and serve to connect them to the linkage system to be described hereafter.

Links 19, 21, and 25, and lever 27 form the main elements of the system which I use to transmit motion from the Bourdon tubes 15 and 16 and are broadly referred to as the linkage system. Fitting 17 on tube 15 is connected pivotally at 18 to link 19. At its other end, link 19 is, in turn, pivotally connected at 20 to link 21. Approximately at the center of link 21, there is provided a pivot 22 to which is connected fitting 23 on tube 16. Link 21 has a third pivot point, namely 24, to which link 25 is also connected. At its opposite end, link 25 is pivotally connected at 26 to one end of lever 27.

Lever 27 contains a slot 28 which extends substantially the length of the lever. Within this slot, and substantially at the end of lever 27 opposite that on which pivot 26 is mounted, there is contained a lever fulcrum 29 which is attached to the bell crank shaped member 30. Member 30 is stationary and is attached at 31 by rivet or otherwise to the gauge casing 10. Member 30 also contains a shaft 32 which serves as a pivot for elliptical gear member 34.

The linkage system just described transmits motion from Bourdon tubes 15 and 16 to the mechanical movement for the indicating hand 33 of which movement elliptical sector 37 and elliptical gear 34 form the main elements. Elliptical sector 37 is pivotally supported on shaft 38 and is provided with radial arms 39. On the radial arm 39 which forms the major radius of sector 37 there is mounted a projecting pin 40 which projects into slot 28 in lever 27 and which is contacted by the sides of slot 28 when lever 27 moves.

The periphery of sector 37 contains gear teeth 36 which mesh with the gear teeth 35 on elliptical pinion 34 whereby motion is imparted to the latter when sector 37 rotates. Rigidly affixed to pinion 34, by means of collar 41, is indicating hand 33 which rotates about shaft 32 when pinion 34 rotates.

The operation of my invention is as follows:
When a source of pressure is admitted through fitting 14 and consequently to Bourdon tubes 15 and 16, these tubes then expand or bend outwardly in a manner well known to the art with the result that tube 15 acting through pivot 18 tends to pull link 19 to the left and upward and tube 16 acting through pivot 22 tends to pull link 21 to the right and upward. The action of the individual tubes 15 and 16 results in moving links 19, 21, and 25 along a path which is the resultant of the force exerted by the individual tubes. This resultant action causes link 25, actuated through pivot 24, to move toward the right and slightly upward with the result that pivot 26 is moved to the right.

When pivot 26 moves, lever 27 is pivoted counter-clockwise at fulcrum 29 and projection 40, which is mounted on one of the radial arms 39 of elliptical sector 37, is also moved counterclockwise with the result that elliptical sector 37 starts to turn in a counter-clockwise direction about shaft 38.

As elliptical sector 37 turns, the elliptical pinion 34 also turns since both sector 37 and pinion 34 are in gear meshing relation through the medium of the gear teeth 35 and 36. Pinion 34 turns in a clockwise direction thereby moving the indicating hand 33 across the calibrations on dial 12.

At the start of the operating cycle, indicating hand 33 moves slowly since substantially the minor axis of the elliptical sector 37 is in contact with substantially the major axis of the elliptical pinion 34. As the movement proceeds the rate of travel of the indicating hand 33 is increased until, when the major axis of the elliptical sector 37 is in line with the minor axis of the elliptical pinion 34, it reaches a maximum speed. As the pressure increases further, the indicating hand 33 is driven past the point of maximum speed and the gear movement goes through a downward cycle during which the indicating hand is moved at a decreasing rate of speed.

This action, i. e., the position of the indicating hand for various positions of the mechanical moving means, is illustrated in Figs. 2 to 4 inclusive. As shown in Fig. 2 the indicating hand 33 is opposite the zero point on the dial 12. Indicating hand 33 is rigidly affixed to collar 41 which in turn is rigidly connected to elliptical pinion 34 and elliptical pinion 34 is operatively connected to the elliptical driving sector 37. As described above, substantially the major axis of the driven pinion 34 is in line with substantially the minor axis of driving sector 37 when indicating hand 33 is in the position shown in Fig. 2.

As member 37 rotates in a counter-clockwise direction, driven member 34 turns in a clockwise direction and the interacting motion of the two gear members results in a fast upswing of the indicating hand 33 until a maximum speed is reached when the members 34 and 37 are in the position shown in Fig. 3. In this position the major axis of the driving member 37 is in line with the minor axis of the driven member 34.

As the member 37 continues to rotate in a counter-clockwise direction, driven member 34 is actuated at a decreasing rate of speed, just the reverse of that occurring when member 34 went from the position indicated in Fig. 2 to the position indicated in Fig. 3. When driven member 34 reaches the end of its travel as indicated in Fig. 4, the indicating hand 33 will be opposite the maximum pressure indication on the dial 12 and the minor axis of the driving member 37 will once more be substantially in line with the major axis of the driven member 34.

Dial 12, shown in Figs. 2 to 4 inclusive, and shown in part in Fig. 1, is formed in circular shape and the calibrations thereof are alined along the arc of a circle. Since the movement of the indicating hand 33 is variable, i. e., varying as the elliptical gear segments coact, the indicating hand will have a greater travel for a given pressure difference when the pressure is in the operating pressure range, i. e., when the indicating hand 33 is in the center portion of the calibrations on dial 12, from that which it will have when the pressure is either below or above said range. Consequently, the calibrations on dial 12 must be spaced progressively farther apart from the end calibrations to the center calibrations at which point the indicating hand has its greatest speed of travel. The particular spacing of the dial calibrations is obtained by converting the travel, for equal pressure increments, of a point along the periphery of a portion of an ellipse, substantially the length of the circular arc, into travel along the circular arc for the same pressure increments. The space between the individual dial calibrations will naturally depend upon the ratio of the major axis of the ellipse to that of the minor axis, as will be evident to one skilled in the art. Where this ratio is large, the end calibrations will naturally be closer together and the center calibrations farther apart than if the ratio were smaller. Where the variable speed motion is obtained by non-annular gears other than elliptical gears, the dial calibrations will simply be laid out in accordance with the indicating hand travel obtained.

From the above description it will be seen that I have invented a mechanical driving movement for the indicating hand of a pressure gauge which is adapted to drive said indicating hand at a variable rate of speed, the greatest speed being within the desired operating pressure range. In this manner, the operator is enabled to detect small variations in pressure within the pressure range in which he is interested since the dial calibrations have their maximum spacing within this pressure range. At the same time he is able to detect when the pressure goes to either side of this desired pressure range. Although devices which impart a variable speed to the indicating hand of a pressure gauge are known, these devices are generally designed to impart a constantly increasing or constantly decreasing speed of travel to the indicating hand. Such an arrangement may be used where the pressure increases according to a certain mathematical function such as a logarithmically. In my device I provide a maximum speed position intermediate minimum speed positions so that the greatest utilization of the gauge can be obtained in the range in which the operator is primarily interested.

Although I have disclosed an elliptical driving sector and an elliptical driven gear as one embodiment of my invention, it is to be understood that any gear mechanism which has a variable radius such that a maximum speed is produced intermediate slow speed positions could be used in place of the gear construction shown. A few examples are heart gears, sinusoidal gears or square gears. Furthermore, although I have indicated the actuating mechanism as including a pair of Bourdon tubes of the self-draining type, it is to be understood that such actuating means could well include a single Bourdon tube or some other pressure responsive element. Elements of the disclosed embodiment such as the pressure responsive element, the gauge casing, etc., form no part of my invention and may be of conventional design.

While I have described a particular embodiment of my invention it is to be understood that I do not wish to be restricted thereto and that I intend to cover all modifications thereof which would be evident to one skilled in the art and which fall within the true spirit and scope of the appended claims.

Having described my invention, what I claim as new and wish to secure by Letters Patent is:

1. A pressure gauge comprising, in combination, dual pressure responsive elements movable in opposite directions, a rotatable sector connected to be actuated by said pressure responsive elements, said sector having at least one major and two minor radii, a rotatable gear driven by said rotatable sector, said gear having at least one minor and two major radii, the gear radii being substantially at right angles to the corresponding radii of the driving sector whereby a variable speed rotation is imparted to the rotatable gear, a pressure scale, and indicating means actuated by said rotatable gear to traverse said pressure scale.

2. A pressure gauge comprising, in combination, dual pressure responsive elements movable simultaneously in opposite directions, an elliptical sector connected to be actuated by said dual pressure responsive elements, an elliptical gear driven by said elliptical sector, said gear having an indicator rigidly affixed thereto, and a pressure indicating dial traversed by said indicator.

3. A pressure gauge comprising, in combination, dual Bourdon tubes movable in response to variations in pressure, an elliptical sector, means including links in connection with said sector and connected to be actuated by said dual Bourdon tubes for driving said sector, an elliptical gear driven by said sector, an indicator rigidly affixed to said gear, and a pressure indicating dial traversed by said indicator.

4. A pressure gauge comprising in combination dual pressure responsive elements movable simultaneously in opposite directions, an elliptical sector connected to be actuated by said dual pressure responsive elements, a graduated dial, the graduations on said dial being spaced progressively farther apart from each other from the end graduations to a point intermediate thereof, an indicator adapted to traverse said graduated dial and means connected to be actuated by said elliptical sector for actuating said indicator across said dial at a speed varying in accordance with said graduations.

5. A pressure gauge comprising in combination dual pressure responsive elements movable simultaneously in opposite directions, an elliptical sector connected to be actuated by said dual pressure responsive elements, a graduated dial, the graduations on said dial being spaced progressively farther apart from each other from the end graduations to a point intermediate thereof, an indicator adapted to traverse said graduated dial, and an elliptical gear driven by said sector, said indicator being affixed to and adapted to be actuated by said gear across said dial at a speed varying in accordance with said graduations.

6. A pressure gauge comprising in combination dual pressure responsive elements movable simultaneously in opposite directions, a rotatable elliptical sector, means including a lever for rotating said sector, said means actuated by said pressure responsive elements, a graduated dial, the graduations on said dial being spaced progressively farther apart from each other from the end graduations to a point intermediate thereof, an indicator adapted to traverse said dial and means connecting said indicator with said sector, said last-mentioned means adapted to actuate said indicator across said dial at a speed varying in accordance with said graduations.

7. A pressure gauge comprising in combination dual pressure responsive elements movable simultaneously in opposite directions, a rotatable elliptical sector, linkage means including a lever for rotating said sector, said means connected to be actuated by said pressure responsive elements, a graduated dial, the graduations on said dial being spaced progressively farther apart from each other from the end graduations to a point intermediate thereof, a gear driven by said sector, and an indicator affixed to said gear, said gear being adapted to actuate said indicator across said dial at a speed varying in accordance with said graduations.

JOHN W. MARSH.